United States Patent [19]

Murphy

[11] Patent Number: 5,091,715

[45] Date of Patent: Feb. 25, 1992

[54] LEAK DETECTION AND ALARM SYSTEM

[76] Inventor: Anthony J. Murphy, 2104 Robinson St., Redondo Beach, Calif. 90278

[21] Appl. No.: 649,141

[22] Filed: Feb. 1, 1991

Related U.S. Application Data

[63] Continuation of Ser. No. 461,660, Jan. 8, 1990, abandoned.

[51] Int. Cl.<sup>5</sup> ............................................. G08B 21/00
[52] U.S. Cl. .................................... 340/604; 340/605; 200/61.05; 73/304 R
[58] Field of Search ...................... 340/604, 605, 693; 200/61.04, 61.05; 73/290 R, 304 R

[56] References Cited

U.S. PATENT DOCUMENTS

| | | |
|---|---|---|
| 336,773 | 1/1886 | Weil . |
| 3,200,388 | 8/1965 | Uhlig . |
| 3,889,247 | 6/1975 | Voll . |
| 4,020,478 | 4/1977 | Hatfield . |
| 4,020,479 | 4/1977 | Conforti et al. . |
| 4,091,363 | 5/1978 | Siegel et al. . |
| 4,225,860 | 9/1980 | Conforti ............................. 340/629 |
| 4,227,190 | 10/1980 | Kelley et al. ..................... 340/604 X |
| 4,246,575 | 1/1981 | Purtell et al. ...................... 340/605 |
| 4,264,902 | 4/1981 | Miller ................................. 340/604 |
| 4,297,686 | 10/1981 | Tom ................................... 340/604 |
| 4,325,060 | 4/1982 | Purtell et al. ...................... 340/604 |
| 4,598,273 | 7/1986 | Bryan, Jr. et al. ................. 340/539 |
| 4,677,371 | 6/1987 | Imaizumi ............................ 340/605 |
| 4,845,472 | 7/1989 | Gordon et al. ................. 340/604 X |

FOREIGN PATENT DOCUMENTS 2923536 12/1980 Fed. Rep. of Germany ...... 340/604

Primary Examiner—Jin F. Ng
Assistant Examiner—Jeffery H. Hofsass
Attorney, Agent, or Firm—Pretty, Schroeder, Brueggemann & Clark

[57] ABSTRACT

A leak alarm system monitors the wetness of a floor. The alarm system comprises a housing having a flat bottom surface and support feet for supporting the housing off the floor such that each one of the support feet is in contact with the floor. Each support foot comprises an electrode of the alarm system. A low resistance condition between two electrodes of opposite polarity, such as occurs in the presence of a water leak, activates the alarm.

8 Claims, 1 Drawing Sheet

LEAK DETECTION AND ALARM SYSTEM

This application is a continuation of application Ser. No. 07/461,660, filed Jan. 8, 1990 now abandoned.

BACKGROUND OF THE INVENTION

1. Field of the Invention

This invention relates to moisture indicating systems, and more particularly to self-contained alarm systems for monitoring the wetness of a floor.

2. Description of the Related Art

Water leaks can cause serious property damage as water collects on a floor. Carpeting, flooring, walls, and furniture can be ruined by water damage due to water leaks. Even leaks of relatively small amounts of water can cause significant damage. In households, these leaks may arise from malfunctions or damage to water heaters, washing machines, and plumbing. Many types of alarm systems have been proposed for detecting leaks of this kind by monitoring the wetness of a floor.

Some alarm systems for monitoring floor moisture include an alarm housing having a bottom surface with a plurality of printed circuit electrodes supported above the floor by support feet. Such alarm systems may include a small remote sensor connected to the housing by a cord. While such alarm systems have great flexibility, they are also of a size that makes them too large and inconvenient for many confined applications, such as under dishwashers or washing machines, and are not as simple to use as more compact systems.

Other alarm systems include a floating housing and support feet extending from the housing, with two separate electrodes on the housing's bottom surface. Although the floating housing increases the survivability of the system, the single pair of electrodes may not have sufficient sensitivity for optimal monitoring.

Finally, other alarm systems may include a moisture sensor comprising a flexible plastic tape with an adhesive backing and a pair of conductive metal strips. The flexible tape is laid out in the area to be monitored for wetness. Although such a detector system provides an extended coverage area, it is not as simple to use as systems comprising a self-contained alarm in a housing, where the alarm is activated and simply placed in the desired location to be monitored.

Thus, there is a need for a floor wetness alarm system that is compact, easy to use, inexpensive, and sensitive to leaks but resistant to false alarms.

SUMMARY OF THE INVENTION

The present invention provides a floor wetness detection and alarm system that is responsive to leaks of the kind that typically occur in a household, the system including a housing of compact size that may be placed in tight spaces, such as under water heaters. The alarm system is easy to use, and need only be activated and then placed in the location to be monitored.

More particularly, the housing has a flat bottom surface and at least three spaced-apart support feet comprising electrodes of the alarm. The feet elevate the bottom of the housing above the floor such that the bottom of each support foot is in direct contact with the floor. The bottom of each support foot comprises a separate electrode of the alarm system, with at least one support foot being of opposite polarity as the others. The alarm system further includes an alarm indicator, such as a horn, for indicating a wet condition. The alarm system is powered by a battery, providing a reliable, self-contained system. An alarm circuit interconnects the system elements such that the alarm indicator is activated when moisture on the floor causes the resistance between two support foot electrodes of opposite polarity to be substantially reduced.

The support feet are preferably spaced apart along the outer edge of the housing's flat bottom surface. This provides a large coverage area for the alarm and reduces the incidence of false alarms wherein the alarm system is triggered by mere condensation on the floor. The support feet are high enough to support the housing's flat bottom surface above the floor, preferably at least one-fourth inch. The housing is just large enough to contain the system components, including the battery and alarm circuit, while still being small enough to fit in tight spaces.

The alarm system is self-contained for reliable operation, having the alarm indicator, moisture detectors (support feet), power supply, and control circuitry contained in a compact package. The alarm system is also provided with a self-test button that is pushed to activate the alarm indicator. This provides a check of the circuitry and battery power. The alarm indicator is preferably placed within the housing of the alarm, but additionally or alternatively may be connected to the alarm circuitry by an electrically conductive wire so that the alarm indicator may be placed in a remote location. The remote location is preferably selected to be in a high traffic area, such as a kitchen or a hallway.

Further features and advantages of the present invention will become apparent from the following detailed description of preferred embodiments of the invention illustrated in the accompanying drawings.

BRIEF DESCRIPTION OF THE DRAWINGS

Preferred embodiments of the invention will now be described in detail with reference to the accompanying drawings, wherein like reference numerals refer to like elements.

DESCRIPTION OF THE PREFERRED EMBODIMENTS

The following detailed descriptions are of the best presently contemplated modes of carrying out the present invention. The descriptions are made for the purpose of illustrating the general principles of the invention and are not to be taken in a limiting sense.

Figure 1:
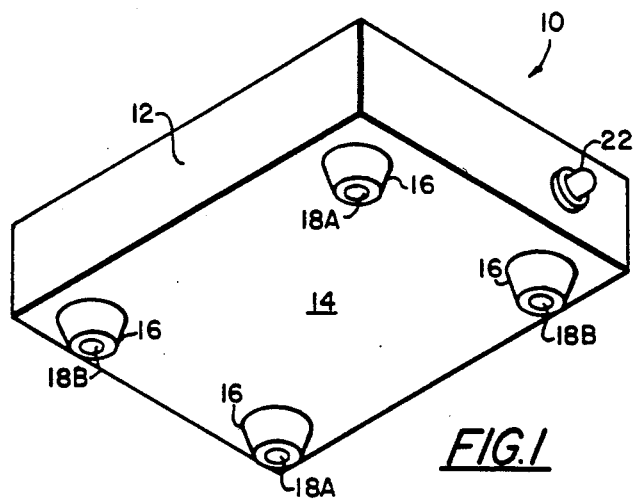
FIG. 1 is a bottom perspective view showing a first embodiment of a leak alarm system in accordance with the present invention.

FIG. 1 is a perspective cut-away view of a water alarm in accordance with the present invention. The water alarm comprises a housing 12 with a flat bottom surface 14. The housing is approximately 2 and one-half inches wide and 3 inches long, with an overall height of approximately 2 inches. Four support feet 16 extend from the housing and support the bottom surface above the floor. The bottom 18 of each support foot is constructed from a conducting material that comprises an electrode of the alarm. Each support foot extends approximately one-fourth inch from the housing's bottom surface. In FIG. 1, two of the support feet 18a have a positive polarity, while the other two support feet 18b have a negative polarity. A test button 22 on the housing activates the alarm indicator when pressed, for testing the power supply and alarm circuitry.

Figure 2:
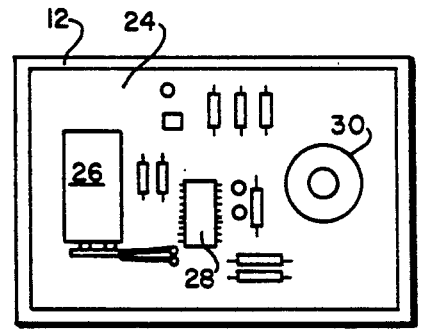
FIG. 2 is a plan view of a circuit board of the leak alarm system.

FIG. 2 is a plan view of a circuit board for the alarm illustrated in FIG. 1. The circuit board 24 is attached to the housing 12 and includes the electronic components comprising the alarm. These components include a 9-volt battery 26, an integrated circuit chip 28, and an alarm indicator 30, as described more fully below. When the test button 22 shown in FIG. 1 is depressed, the alarm indicator is activated if the alarm circuitry is functioning properly and the battery is providing sufficient power. Thus, the test button provides a check of the alarm circuitry and the battery.

Figure 3:
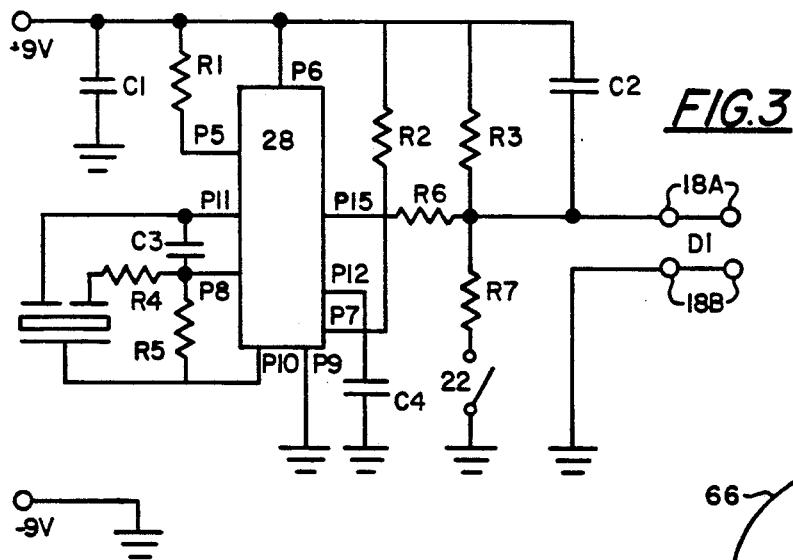
FIG. 3 is a schematic diagram of an electrical circuit included in the leak alarm system of FIG. 1.

FIG. 3 is a schematic diagram of a water leak alarm in accordance with the present invention and corresponding to the alarm shown in FIGS. 1-2. The alarm uses an integrated circuit 28, such as the MC14467-P1 chip manufactured by Motorola. The chip has a plurality of pins that enable the chip to be connected into the circuit. These pins are identified in FIG. 3 by the prefix "P" followed by a numeral. The chip includes a high input impedance comparator and a driver for an alarm indicator. The electrodes of the supporting feet comprise the detector element D1 of the circuit. Electrodes of like polarity are connected in series, as shown in FIG. 3. When a conductive liquid connects one or more sets of the detector input terminals (the support foot electrodes), the voltage at pin P15 is pulled down below a preset level, tripping the alarm. A capacitor C2 prevents minor transients, such as static electricity, from tripping the alarm. A resistor R6 protects the input pin P15 from static voltage damage. The components C4 and R2 set the frequency at which the detector is sampled by the chip for an alarm condition. Varying the values of C4 and R2 varies the frequency of sampling. A resistor R1 is part of the low battery test circuit of the chip. The components C3, R4, and R5 set the sonic output level for the alarm indicator. The values of these components may be adjusted slightly depending on the type of alarm indicator used. The resistor R7 is a test load used when checking the operation of the alarm with the test switch 22.

The value of C2 determines the response time of the alarm, and reducing the value speeds up the response time, effectively increasing the sensitivity of the alarm. Increasing the value of the resistor R3 also makes the alarm more sensitive. The values indicated in FIG. 3 have been selected as the best compromise for overall operation of the alarm, but may be varied depending on the particular circumstances required. All of the resistors used were of 5% accuracy and one-fourth watt power handling capacity. An audible indication that moisture has been detected is provided by the alarm indicator 30, which in the preferred embodiment is a piezoelectric horn. The particular horn used was manufactured by Murata-Eric, stock no. IKM 29-3A. Those skilled in the art will recognize that the illustrated circuit is only one form of a circuit that may be utilized in accordance with the present invention.

Figure 4:
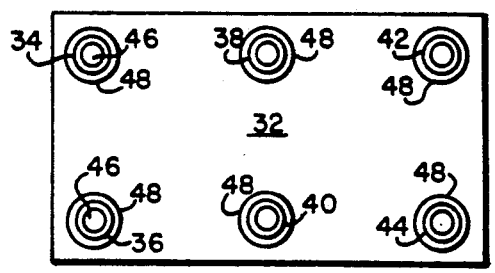
FIG. 4 is a plan view of the bottom surface of a second embodiment of a leak alarm system in accordance with the present invention.

FIG. 4 shows another embodiment of the present invention having a flat bottom surface 32 and six support feet 34-44 extending therefrom. Each one of the support feet has a tip comprising a conducting electrode 46. In the illustrated embodiment, each support foot is constructed entirely of a conductive material. This reduces production costs because it avoids having to form the support foot by joining together a conductive portion and a support portion. Instead, each conductive support foot is joined directly to the alarm circuit board (not illustrated in FIG. 4), extending through openings 48 in the flat bottom surface 32 to elevate the alarm housing.

At least one of the support foot electrodes is of opposite polarity from the others. In the FIG. 4 embodiment, electrodes 34, 42, and 40 have a positive polarity, while electrodes 36, 38, and 44 have a negative polarity. The polarity may be reversed. The alternating polarity optimally distributes polarity of the electrodes so as to provide maximum detection of moisture. That is, if only one of the electrodes was of a positive polarity and all of the remaining electrodes were of a negative polarity, detection would not be optimal. In that case, moisture could form in a continuous pattern that might contact the electrodes 38, 42, 36, 40, and 44 without setting off the alarm if all of these electrodes were of the same polarity. It would not be until the moisture also contacted the remaining support foot 34 that the alarm would be set off. With the alternating polarity described, as soon as moisture forms a continuous pattern contacting any two adjacent supporting feet, the alarm will be activated. For example, the pattern of moisture need only be in conducting contact with the support feet 34 and 38, or 34 and 36. The alarm will also be set off if the moisture is in conducting contact with the support feet 36 and 40, or 40 and 44, and so on.

Figure 5:
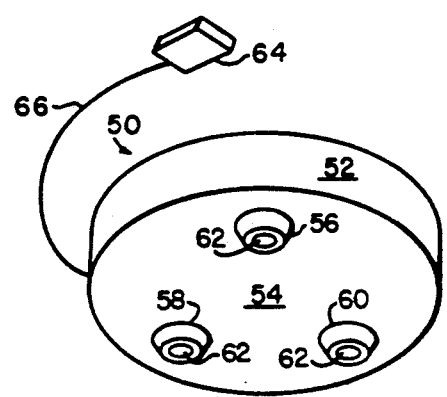
FIG. 5 is a perspective view showing a third embodiment of a leak alarm system in accordance with the present invention.

FIG. 5 shows an alternate embodiment 50 of the present invention for monitoring the wetness of a floor. The alarm 50 comprises a housing 52 having a circular shape and a circular flat bottom surface 54. Three support feet 56, 58, 60 extend from the bottom of the housing along its periphery. The support feet extend from the housing so as to support the surface 54 above the floor. Three support feet are the minimum required to support the bottom of the housing above the floor. The tip of each support foot is provided with a conducting electrode comprising the detector of the alarm. The housing size and feet are preferably constructed such that the feet are spaced at least approximately one-half inch apart. The electrode of one of the support feet 58 is of a positive polarity, while the electrodes of the other support feet are of a negative polarity. The polarities of the feet may be reversed.

The alarm indicator 30 is shown in FIG. 5 as a remote indicator 64 attached to the alarm by an electrically conductive cable 66 that is connected to the alarm circuitry. Such a configuration allows the indicator to be located at a distance from the actual point of moisture detection. The housing 52 with its support feet may then be located near a basement water heater, for example, while the remote indicator 64 may be located in a kitchen, hallway, or other high traffic area where it is most likely to be heard.

Those skilled in the art will appreciate that other changes from the illustrated embodiments may be possible without departing from the principles of the invention. For example, the support feet electrodes may be augmented by a strip detector comprising a length of flexible tape having conducting elements. The alarm housing may be provided with louvers or perforations in the vicinity of the internal alarm indicator for increased audibility. The louvers or holes should be small enough and oriented such that water entry into the housing will be minimized. In view of these and other possible variations within the abilities of those skilled in the art, the scope of the present invention should not be limited by the particular embodiments described herein but should only be defined by the appended claims and equivalents thereof.

I claim:

1. A liquid detection and alarm system for monitoring the wetness of a floor, the alarm system comprising:
   a housing having a flat bottom surface;
   at least three spaced-apart support feet for supporting the bottom surface of the housing above the floor, such that the bottom of each support foot is in contact with the floor, wherein the bottom of each support foot is constructed from an electrically conductive material, so as to have a single electrical polarity, such that at least one support foot is of opposite polarity from the others;
   an electrically activated alarm indicator;
   a battery connector for connecting a battery to the alarm system; and
   an alarm circuit located within the housing for interconnecting all of the support feet, the alarm indicator, and the battery such that the alarm circuit activates the alarm indicator in response to a reduced resistance condition between any two separate support feet of opposite polarity.

2. An alarm system as recited in claim 1, wherein:
   the housing is substantially rectangular, with four corners;
   the alarm system includes four support feet, one support foot being located at each housing corner; and
   the bottom of each support foot has an opposite polarity to the bottoms of the two adjacent corner support feet.

3. An alarm system as recited in claim 1, wherein the alarm system includes more than three support feet and the bottom of each support foot has an opposite polarity to the bottoms of the two adjacent support feet.

4. An alarm system as recited in claim 1, wherein the bottom surface of the housing is circular and the three support feet are located at substantially equally-spaced intervals on the periphery of the housing bottom surface.

5. An alarm system as recited in claim 1, wherein the alarm indicator includes a remote indicator and an electrically conductive cable for connecting the remote indicator to the alarm circuit.

6. An alarm system as recited in claim 1, wherein the support feet are constructed entirely from an electrically conductive material.

7. An alarm system as recited in claim 6, wherein the bottom surface of the housing includes an opening for each support foot such that each support foot extends through the housing.

8. A liquid detection and alarm system for monitoring the wetness of a floor, the alarm system comprising:
   a housing having a flat bottom surface;
   at least four spaced-apart separate support feet for supporting the bottom surface of the housing above the floor, such that each support foot is in contact with the floor, wherein the bottom of each support foot is an electrically conductive material such that each support foot has an opposite electrical polarity to that of the two adjacent support feet;
   an electrically activated alarm indicator;
   a battery connector for connecting a battery to the alarm system;
   an alarm circuit located within the housing for interconnecting all of the support feet, the alarm indicator, and the battery such that the alarm circuit activates the alarm indicator in response to a reduced resistance condition between any two support feet of opposite polarity; and
   an alarm test button operable from outside the housing such that the test button activates the alarm indicator when the button is depressed.

* * * * *